US008504655B1

(12) United States Patent
Bertz et al.

(10) Patent No.: US 8,504,655 B1
(45) Date of Patent: Aug. 6, 2013

(54) PROXY DELEGATION FOR CONTENT DELIVERY

(75) Inventors: Lyle T. Bertz, Lee's Summit, MO (US); Jagannath Ghoshal, Overland Park, KS (US); James W. Norris, Kansas City, MO (US); Dan Sershen, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 252 days.

(21) Appl. No.: 13/013,391

(22) Filed: Jan. 25, 2011

(51) Int. Cl.
*G06F 15/16* (2006.01)

(52) U.S. Cl.
USPC .......................................... 709/219; 709/226

(58) Field of Classification Search
USPC ................................................ 709/229, 219
See application file for complete search history.

(56) References Cited

U.S. PATENT DOCUMENTS

| 7,793,342 | B1* | 9/2010 | Ebrahimi et al. | 726/8 |
| 8,250,644 | B1* | 8/2012 | Upadhyay et al. | 726/12 |
| 2004/0128558 | A1* | 7/2004 | Barrett | 713/202 |
| 2005/0251832 | A1 | 11/2005 | Chiueh | |
| 2009/0113532 | A1* | 4/2009 | Lapidous | 726/7 |
| 2011/0072108 | A1* | 3/2011 | Gopalakrishnan | 709/217 |

* cited by examiner

*Primary Examiner* — Hassan Kizou
*Assistant Examiner* — Hashim Bhatti

(57) ABSTRACT

Systems and methods of delegating a proxy node for content delivery to a wireless device are provided. A wireless device authenticates with a proxy node, and the proxy node provides to the wireless device a list of content stored on a first content node. If the wireless device requests a second content stored on a second content node, the second content node sends an attachment request to the proxy node, the proxy node associates the second content node with the proxy node, and the proxy node delivers the second content to the wireless device.

16 Claims, 6 Drawing Sheets

PROXY DELEGATION FOR CONTENT DELIVERY

TECHNICAL BACKGROUND

Wireless communication may be used to deliver digital content such as images, audio and video to a wireless device. Digital content may be stored on a network node, for example a server in communication with a network. Rather than delivering digital content directly from a network node to a wireless device, often digital content is sent from the network node to a proxy node and then to the wireless device. Before the proxy node will provide content to the wireless device, the proxy node requires a wireless device to submit credentials for authentication.

Typically, different network nodes which store content, or content nodes, provide their content through a different proxy node associated with each content node. Consequently, as a user of a wireless device desires to receive content which is available from different content nodes, the wireless device must authenticate with a different proxy node each time the user requests new content. Requiring an authentication to a different proxy node each time new content is selected can introduce significant delay in providing the newly selected content to the wireless device, degrading the user experience.

Overview

Systems and methods of delegating a proxy node for content delivery to a wireless device are provided. A wireless device authenticates with a proxy node, and the proxy node provides to the wireless device a list of content stored on a first content node. If the wireless device requests a second content stored on a second content node, the second content node sends an attachment request to the proxy node, and after associating the second content node with the proxy node the proxy node delivers the second content to the wireless device.

DETAILED DESCRIPTION

In one embodiment, a wireless device authenticates with a proxy node, and the proxy node provides to the wireless device a list of content stored on a first content node. The wireless device may then receive the first content from the proxy node. The wireless device may send request to a second content node for a second content, the request including proxy delegation information of the proxy node. In response to the content request, the second content node sends an attachment request to the proxy node, the proxy node associates the second content node with the proxy node, and the proxy node delivers the second content to the wireless device.

Figure 1:
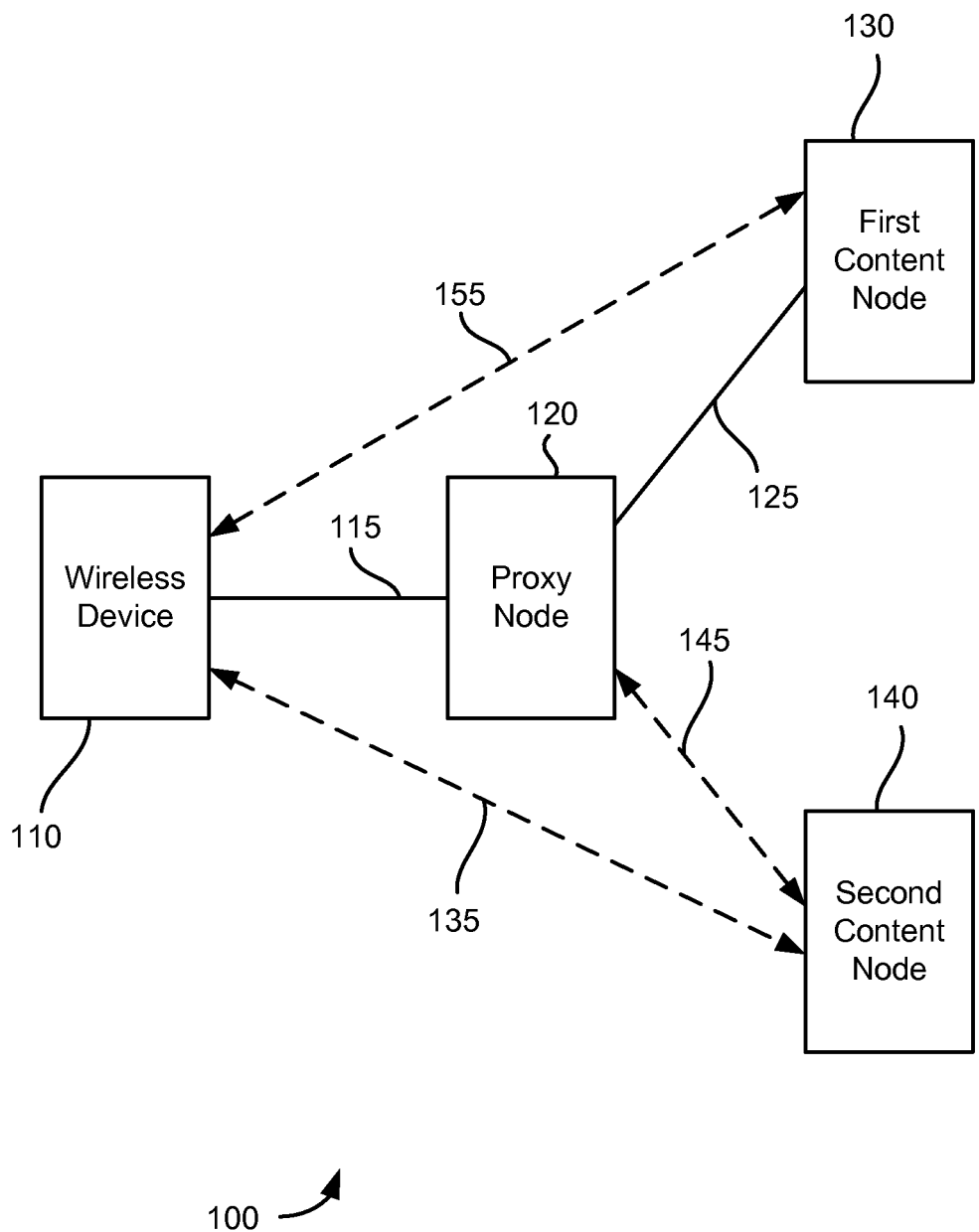
FIG. 1 is a block diagram illustrating an exemplary communication system to deliver content to a wireless device.

FIG. 1 illustrates an exemplary communication system 100 to deliver content to a wireless device. Communication system 100 comprises wireless device 110, a proxy node 120, a first content node 130, and a second content node 140. Examples of a wireless device 110 can include a telephone, a computer, a personal digital assistant, an internet access device, or other device capable of wireless communication, including combinations thereof. The wireless device 110 can store and execute machine-readable instructions capable of requesting digital content from a network, receiving the content and providing output of the content.

The proxy node 120 is in communication with the wireless device 110 through communication link 115. The proxy node 120 can be any network element capable of communicating with the wireless device 110, and comprises a processor and associated circuitry and software to receive and store digital content and to transmit the content to the wireless device 110.

First content node 130 is in communication with the proxy node 120 through communication link 125 and with wireless device 110 through communication link 155. First content node 130 can be any network element capable of storing digital content and being associated with the proxy node 120 to deliver digital content to the proxy node 120. As illustrated in FIG. 1, the first content node 130 is associated with the proxy node 120. That is, the wireless device 110 may request content which is stored on the first content node 130, and the content will be delivered to the wireless device 110 through the proxy node 120.

Second content node 140 is in communication with the wireless device 110 through communication link 135 and with the proxy node 120 through communication link 145. Second content node 140 can be any network element capable of being associated with the proxy node 120 to deliver digital content to the proxy node 120. The wireless device 110 may request content which is stored on the second content node 140, and the second content node 140 may be associated with the proxy node 120 to deliver the content to the wireless device 110 through the proxy node 120, as further described below.

Communication links 115, 125, 135, 145 and 155 can be wired or wireless communication links or combinations thereof. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Content may be transmitted in a network using control protocols such as transport control protocol (TCP) to govern end-to-end connections and an application layer transport protocol such as real-time transport protocol (RTP), hypertext transfer protocol (HTTP), session initiation protocol (SIP), and real-time streaming protocol (RTSP) to establish and control media sessions between network end points.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among the proxy node 120, the first content node 130 and the second content node 140 which are omitted for clarity, including additional processing nodes, routers, gateways, and physical and/or wireless data links for carrying data among the various network elements.

In one embodiment, the wireless device 110 authenticates with the proxy node 120, which is associated with the first content node 130. The proxy node 120 provides the wireless device 110 with a list of first content stored on the first content node 130, and the wireless device 110 may request and receive the first content from the proxy node 120. If the user of the wireless device 110 wishes to receive different content than the first content, the wireless device 110 may send request to a second content node 140 for a second content, the request including proxy delegation information of the proxy node 120. In response to the content request, the second content node 140 sends an attachment request to the proxy node 120, and the proxy node 120 associates the second content node 140 with the proxy node 120. The proxy node 120 can then deliver the second content to the wireless device 110.

In one example of the communication system 100, the first and second content nodes 130 and 140 can store video content. A service provider of the wireless device 110 can make available video content visible to a user of the wireless device 110 through a video delivery service of the service provider. For example, the service provider can provide a streaming video service to wireless devices, wherein available content is identified to a user of the wireless device 110. The indication of available content can be in various forms, such as by individual content title, or content can be grouped or organized and indicated to the user according to various schemes. For example, content can be organized by genre, by title, or by some form of content rating (such as a user generated rating, or a content rating such as a Motion Picture Association of America film rating). Content can also be to a user grouped according to a "channel," which could be related to a topic (for example, "football") or a genre (for example, "sports") or even by a content provider (for example, ESPN). In addition, the wireless device 110 can identify available video content through some form of network search. Regardless of how the content is made visible to the wireless device 110, information can be provided to the wireless device 110 to enable the wireless device 110 to request content through the proxy node 120 from content nodes which are associated with the proxy node 120, or to request content from content nodes which are not yet associated with the proxy node 120.

Thus, when the wireless device 110 authenticates with the proxy node 120, the proxy node 120 can provide the wireless device 110 with a list of first video content stored on the first content node 130, and the wireless device 110 can request the first video content from the proxy node 120. If the user of the wireless device 110 wishes to view different video content, the wireless device 110 sends a request to the second content node 140 for a second video content, as described above. The second content node 140 sends an attachment request to the proxy node 120, and the proxy node 120 associates the second content node 140 with the proxy node 120. The proxy node 120 then delivers the second video content to the wireless device 110. The wireless device 110 can control the streaming of the video content by sending commands to the proxy node 120, for example, using playback control commands supported by a control protocol such as RTSP.

Figure 2:
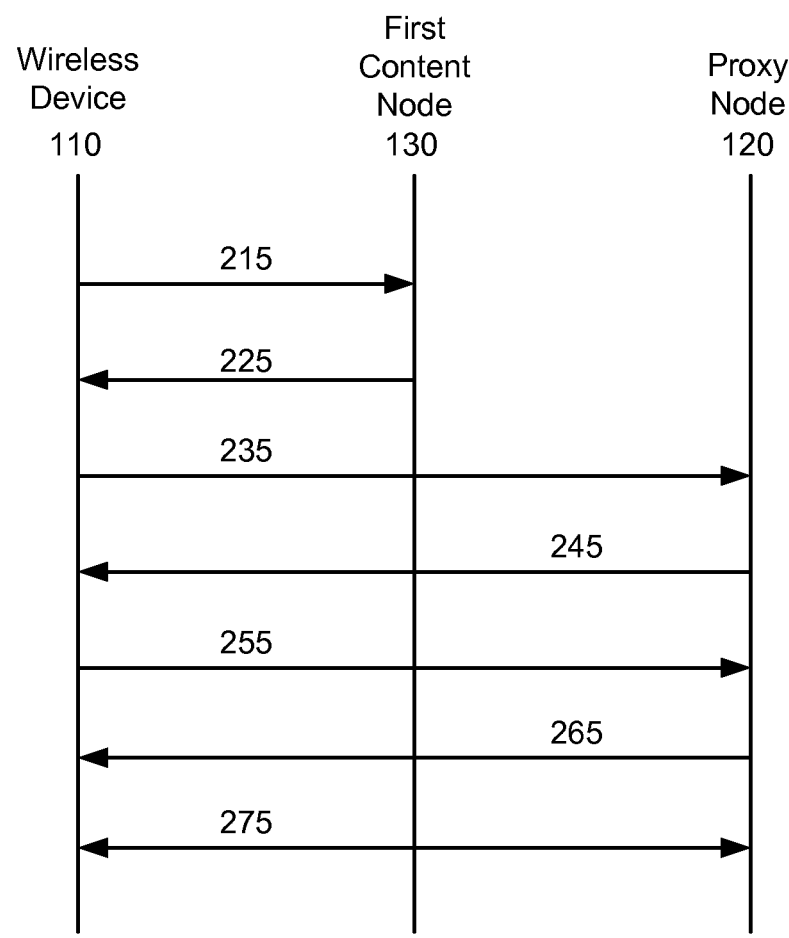
FIG. 2 is a signal flow diagram illustrating an example of requesting content for delivery to a wireless device.

FIG. 2 is a signal flow diagram illustrating an example of requesting content for delivery to a wireless device. Wireless device 110, which has established a connection to the communications network 100, sends a request for content 215 to the first content node 130 for a first content. Content node 130 is associated with the proxy node 120, so the first content node 130 responds to the content request 215 with a proxy delegation 225. The proxy delegation 225 informs the wireless device 110 of the network location of the associated proxy node 120 and other such information as the wireless device 110 needs to communicate with the proxy node 120 to request and receive the first content. A proxy delegation 225 may include, for example, a hypertext transfer protocol (HTTP) status code indicating that further action is required from the wireless device 110 to complete the request for the content, such as HTTP code 305 "Use Proxy".

Having received the proxy delegation 225 from the content node 130, the wireless device 110 sends a content request 235 to the proxy node. The proxy node 120 responds to the content request 235 with an authorization challenge 245. The authorization challenge 245 comprises a request that the wireless device 110 provide authorization credentials 255 to the proxy node 120. The wireless device 110 provides credentials to the proxy node 120, and the proxy node 120 authenticates the wireless device 110. When the wireless device 110 is authenticated for the proxy node 120, the proxy node 120 provides the wireless device 110 with a list 265 of content available through the proxy node 120. The wireless device 110 can thereafter request and receive content 275 stored on the content node 130. The wireless device 110 stores the proxy node information from the proxy delegation 225 for use when requesting content which is not stored on the first content node 130, as further described below.

Figure 3:
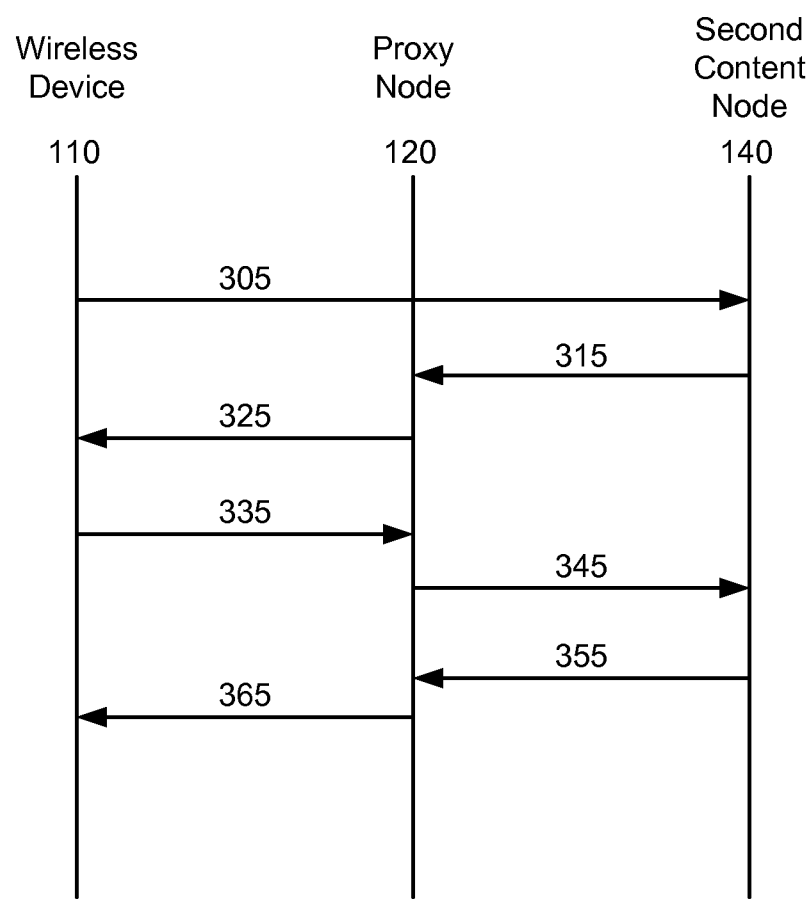
FIG. 3 is a signal flow diagram illustrating an example of associating a content node with a proxy node to deliver content to a wireless device.

FIG. 3 is a signal flow diagram illustrating an example of associating a content node with a proxy node to deliver content to a wireless device. If a user of the wireless device 110 desires to receive content which is not available from the first content node 130 (i.e., second content), the wireless device 110 can send a content request 305 to the second content node 140 for the desired second content. The second content node 140 is not associated with the proxy node 120. Accordingly, the content request 305 includes the information about the proxy node 120 from the proxy delegation 225 received from the first content node 130. In response to the content request 305, the second content node 140 determines whether it can associate with the proxy node 120. If the second content node 140 determines that it can associate with the proxy node 120, the second content node 140 sends an attachment request 315 to the proxy node 120 including an indication of the network address of, and the content available on, the second content node 140. The proxy node 120 creates an association with the second content node 140, and sends an update message 325 to the wireless device 110, informing the wireless device 110 of the updated list of content nodes associated with the proxy node 120 and/or an updated list of the content available through the proxy node 120, representing the content available from the first and second content nodes 130 and 140.

Based on the updated list of associated content nodes, the wireless device 110 may send a content request 335 to the proxy node 120, which relays the content request 345 to the second content node 140. In response, the second content node provides the requested content 355 to the proxy node 120, and the proxy node provides the content 365 to the wireless device 110.

In an example of the signal flows of FIGS. 2 and 3, the wireless device 110 can request video content available from the first content node 130. The first content node 130 responds with a proxy delegation 225 to the proxy node 120, and the wireless device can authenticate with the proxy node 120 and receive first video content from the first content node 130. The wireless device can also request content stored on the second content node 140. The second content node 140 sends an attachment request to the proxy node 120, and the proxy node 120 associates the second content node 140 with the proxy node 120. The proxy node 120 then delivers the second video content to the wireless device 110. The wireless device 110 can control the streaming of the first or the second video content by sending commands to the proxy node 120, for example, using playback control commands supported by a control protocol such as RTSP.

Figure 4A:
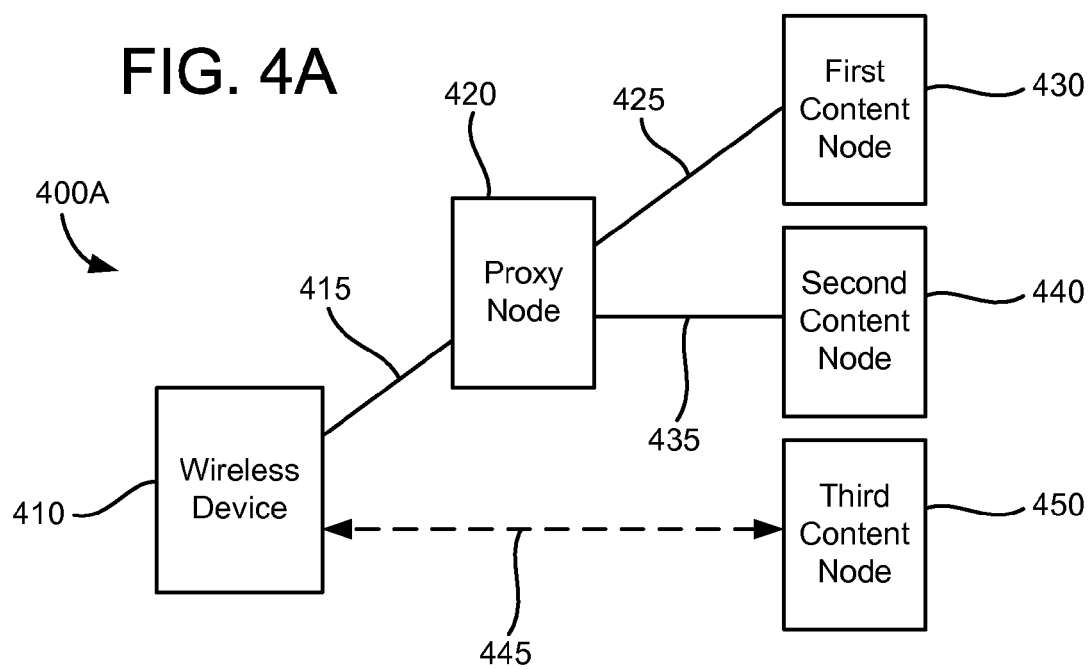
FIGS. 4A and 4B are block diagrams illustrating additional exemplary communication systems to deliver content to a wireless device.
Figure 4B:
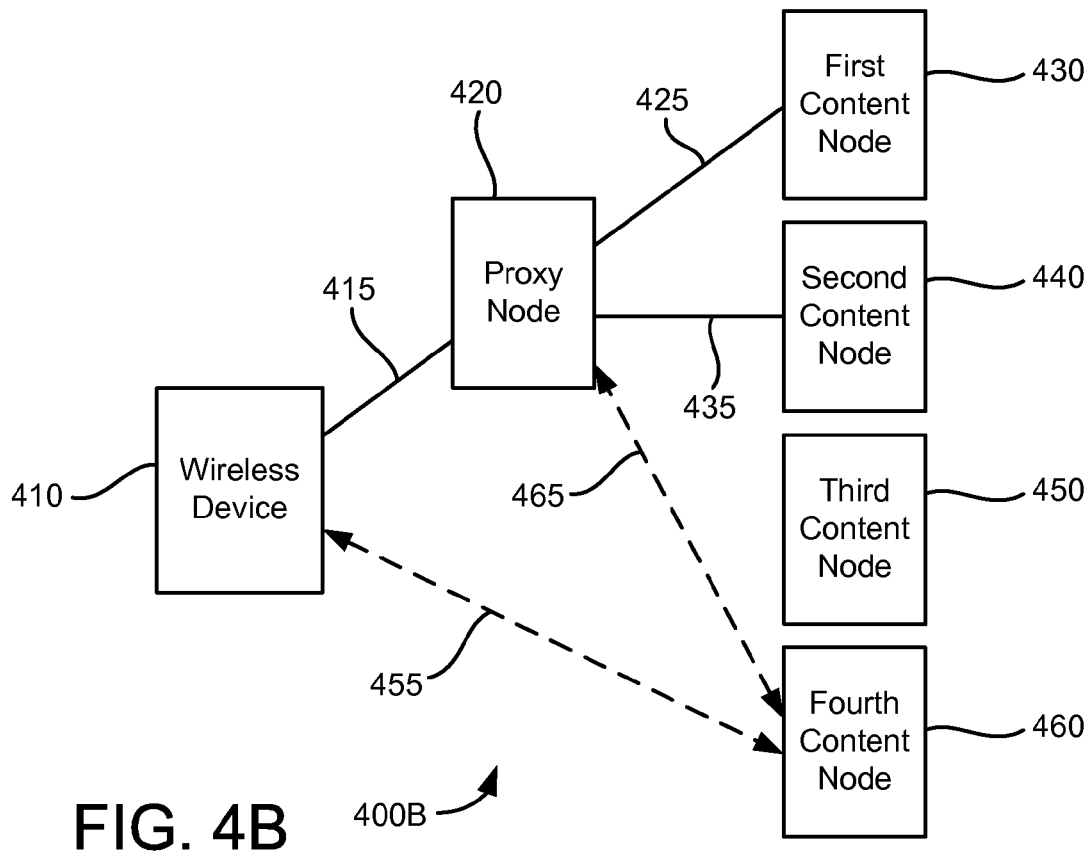

FIGS. 4A and 4B are block diagrams illustrating exemplary communication systems 400A and 400B to deliver content to a wireless device. Communication system 400A comprises a wireless device 410, a proxy node 420, a first content node 430, a second content node 440, a third content node 450, and a fourth content node 460. The wireless device 410 is in communication with the proxy node 420 through communication link 415 and with the third proxy node through communication link 445. The first and second content nodes 430 and 440 are in communication with the proxy node 420 through communication links 425 and 435, respectively, and are associated with the proxy node 420. The fourth content node 460 is in communication with the wireless device 410 through communication link 455, and with the proxy node through communication link 420. These elements are similar to those described above with respect to FIG. 1, and further description is omitted for brevity. While only the first and second content nodes 430 and 440 are illustrated as being associated with the proxy node 420, this is not intended as a limitation, and any number of content nodes may be associated with the proxy node 420.

Figure 5:
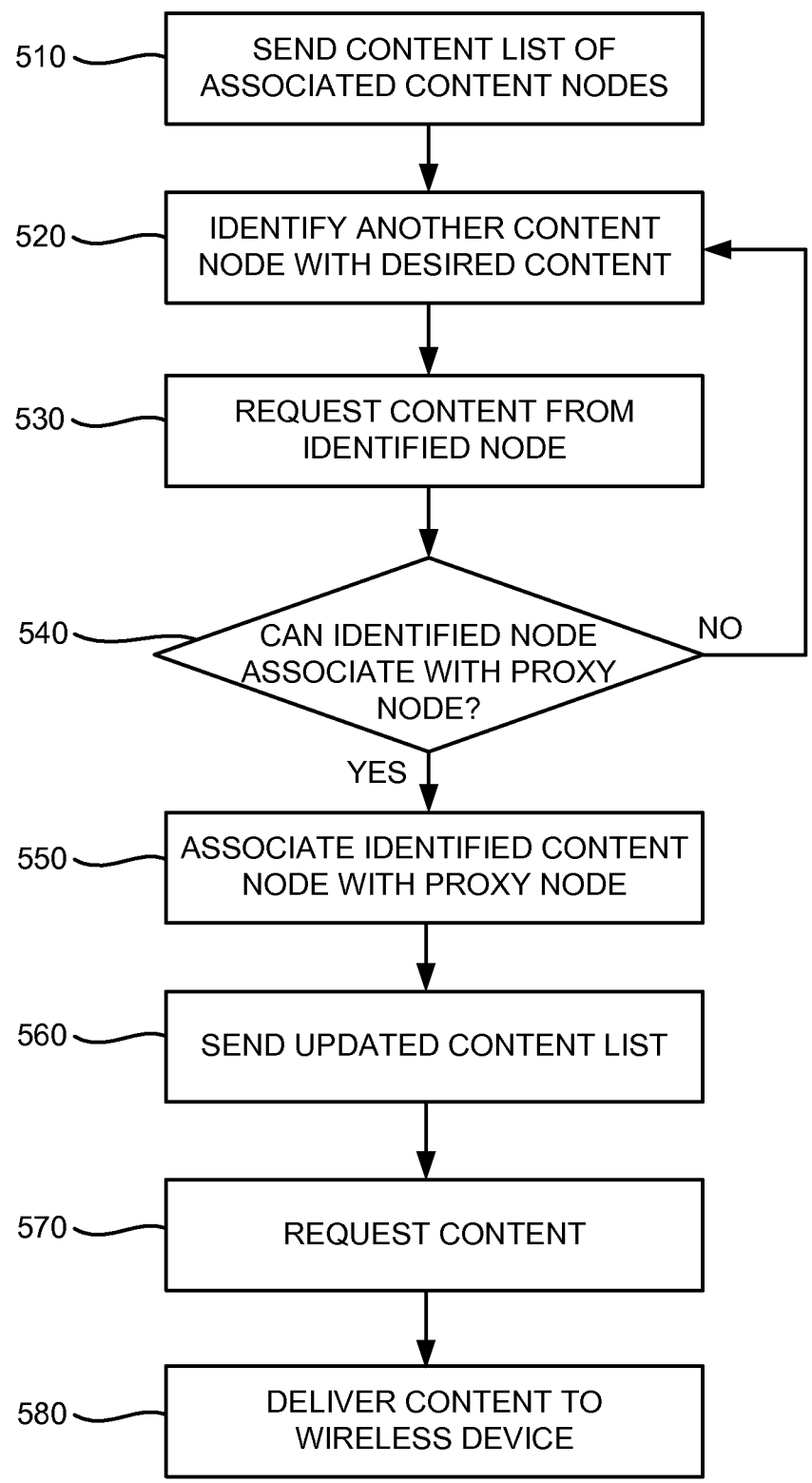
FIG. 5 is a flowchart illustrating an exemplary method of associating a content node with a proxy node to deliver content to a wireless device.

FIG. 5 is a flowchart illustrating an exemplary method of associating a content node with a proxy node to deliver content to a wireless device. Relating FIG. 5 to the exemplary communication systems illustrated in FIGS. 4A and 4B, when a wireless device 410 is authenticated for a proxy node 420, the proxy node 420 provides a list of content available from the associated first and second content nodes 430 and 440 (operation 510). When a user of the wireless device 410 desires content which is not available from the first and second content nodes 430 and 440, the wireless device 410 identifies a third content node 450 which can provide the desired content (operation 520). The third content node can be identified through a form of network search. Alternatively, available content and/or content nodes can be identified by a network service provider. Other ways to identify a content node having available content are also possible. The wireless device 410 sends a content request including a previously-received proxy delegation for the proxy node 420 to the third content node 450 over communication link 445 (operation 530). The third communication node 450 then determines whether it can associate with the proxy node 420 (operation 540). There are any number of reasons why a content node may not associate with a proxy node. For example, the content node may be configured to not associate with a particular proxy node if there is a certain level of network congestion. Also, the content server may have identified a security concern with the proxy node. The content node may also be configured to not associate with the proxy node because each is controlled by a business competitor. A connection between the second content node and the proxy node may also be restricted or denied for some other reason. In this case, the third content node 450 determines that it cannot associate with the proxy node 420, and sends an indication to the wireless device (operation 540, NO path).

The wireless device 420 then identifies a fourth content node 460 which can provide the desired content (operation 520), and the wireless device 410 sends a content request including a previously-received proxy delegation for the proxy node 420 to the fourth content node 460 over communication link 455 (operation 530). In this case, the fourth content node determines that it can associate with the proxy node 420 (operation 540, YES path). The fourth content node 460 sends an attachment request to the proxy node 120 including an indication of the network address of, and the content available on, the fourth content node 460, and the proxy node 420 creates an association with the fourth content node 460 (operation 550). The proxy node 420 sends an update message to the wireless device 110 (in operation 560) informing the wireless device 110 of the updated list of content available from the first, second and fourth content nodes 430, 440 and 460 associated with the proxy node 420. Based on the updated list of content, the wireless device 410 may send a content request to the proxy node 420 for the content available from the fourth content node 460 (operation 570). The proxy node 420 relays the content request to the fourth content node 460, the fourth content node 460 provides the requested content to the proxy node 420, and the proxy node 420 provides the content to the wireless device 410 (operation 580).

In one example of the communication systems 400A and 400B, the content nodes 430, 440, 450 and 460 can store video content. A service provider of the wireless device 410 can make available video content visible to a user of the wireless device 410 through, for example, a video delivery service of the service provider, or the wireless device 410 can identify available video content through some form of network search. Information can be provided to the wireless device 410 to enable the wireless device 410 to request content through the proxy node 420 from content nodes 430 and 440 which are associated with the proxy node 420, or to request content from content nodes 450 and 460 which are not yet associated with the proxy node 420.

Thus, when the wireless device 410 authenticates with the proxy node 420, the proxy node 420 can provide the wireless device 410 with a list of video content stored on the first and second content nodes 430 and 440, and the wireless device 410 can request the video content from the proxy node 420. If the user of the wireless device 410 wishes to view different video content, the wireless device 410 sends a request to the third content node 450 for a third video content, as described above. If the third content node 450 cannot associate with the proxy node 420, the third content node sends an indication to the wireless device 410. The wireless device 410 identifies a fourth content node 460 which can provide the desired video content, and the wireless device 410 sends a content request including a previously-received proxy delegation for the proxy node 420 to the fourth content node 460. The fourth content node determines that it can associate with the proxy node 420 and sends an attachment request to the proxy node 120 including an indication of the network address of, and the content available on, the fourth content node 460. The proxy node 420 creates an association with the fourth content node 460 and sends an update message to the wireless device 410 informing the wireless device 410 of the updated list of content available from the first, second and fourth content nodes 430, 440 and 460 associated with the proxy node 420. Based on the updated list of content, the wireless device 410 may send a content request to the proxy node 420 for the video content available from the fourth content node 460. The proxy node 420 can relay the content request to the fourth content node 460, the fourth content node 460 can provide the requested video content to the proxy node 420, and the proxy node 420 can provide the video content to the wireless device 410. The wireless device 410 can control the streaming of the video content by sending commands to the proxy node 420, for example, using playback control commands supported by a control protocol such as RTSP.

Figure 6:
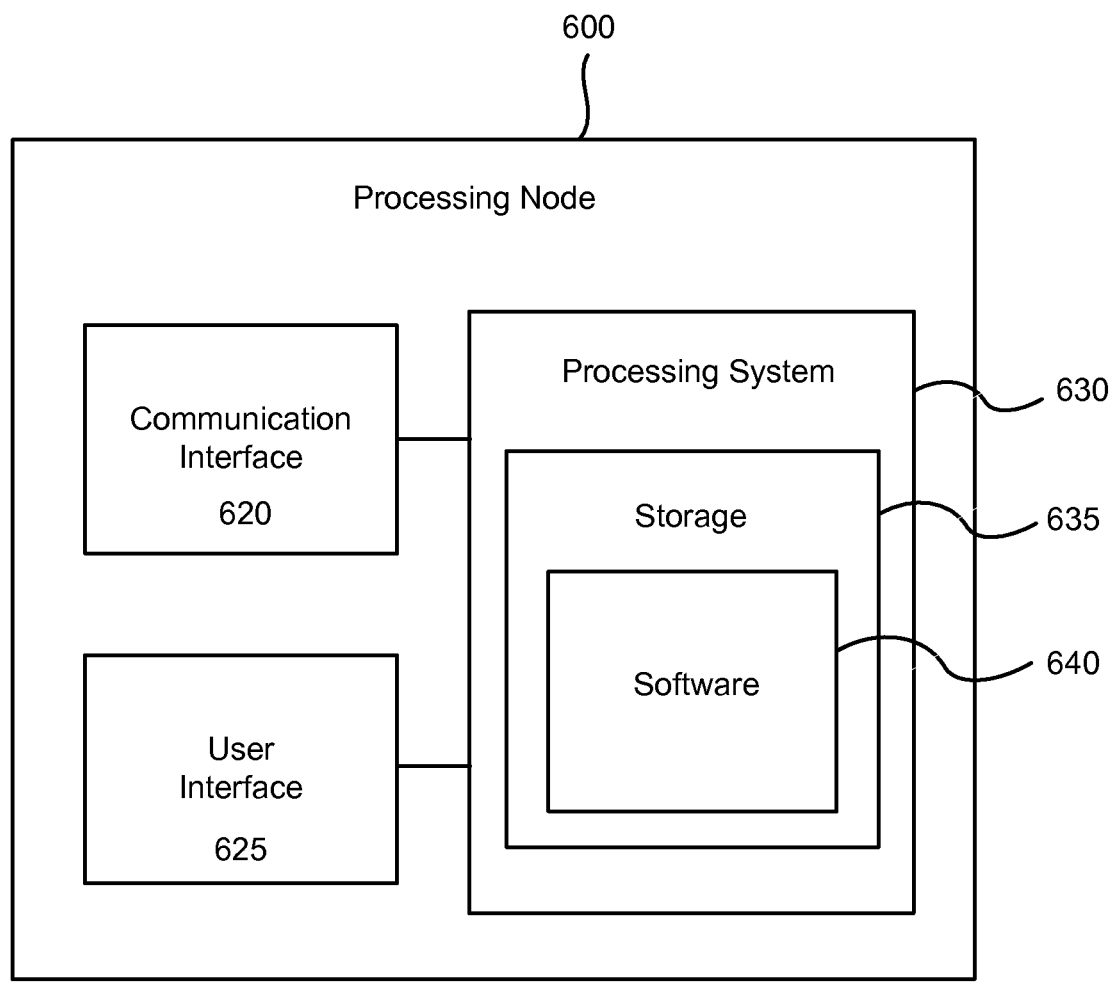
FIG. 6 is a block diagram that illustrates an exemplary network node.

FIG. 6 is a block diagram that illustrates an exemplary processing node 600. Examples of a processing node 600 include proxy nodes 120 and 420, first and second content nodes 130 and 140, and first, second, third and fourth content nodes 430-460. Processing node 600 can include a communication interface 620 and a user interface 625, each in communication with a processing system 630. Processing node 600 can communicate with other network elements, including wireless devices and other processing nodes, over a wired and/or wireless communication link through the communication interface 620. Processing system 630 can include a storage unit 635, comprising a disk drive, flash drive, memory circuitry, or other memory device. Storage unit 635 can store software 640 which is used in the operation of the processing node 600. Software 640 may include an operating system, utilities, drivers, network interfaces, applications, or some other type of software. Storage unit 635 can also store digital content. Where a processing node 600 is representative of a content node, the processing node 600 can determine whether the processing node can associate with a proxy node, send content to communication interface 620, and communication interface 620 can transmit the content to the proxy node, or to another processing node. Where a processing node 600 is representative of a proxy node, the processing node 600 can authenticate a wireless device, can receive and store content received from another processing node, and can send the content to a wireless device. Processing node 600 can also include a user interface 625 to permit a user to configure and control the operation of the processing node 600.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of delegating a proxy node for content delivery, comprising:
   providing from a proxy node to a wireless device a list of first content stored on a first content node;
   receiving at the proxy node an attachment request from a second content node in response to a content request sent from the wireless device to the second content node for second content stored on the second content node, wherein the content request from the wireless device to the second content node comprises a proxy delegation to the proxy node;
   determining whether the second content node can associate with the proxy node;
   associating the second node with the proxy node in response to the attachment request; and
   delivering by the proxy node the second content to the wireless device.

2. The method of claim 1, wherein the attachment request comprises a network address of the second content node and an indication of the second content.

3. The method of claim 1, further comprising:
   sending to the wireless device an updated list of content comprising the first content and the second content.

4. The method of claim 1, wherein the second content is delivered in response to a request for the second content from the wireless device.

5. The method of claim 1, wherein the second content is delivered to the wireless device automatically when the second node is attached to the proxy node.

6. The method of claim 1, wherein before the act of providing, the method further comprises:
   sending a request for the first content from the wireless device to the first content node;
   receiving at the wireless device a proxy delegation to the proxy node from the first content node;
   receiving from the wireless device at the proxy node a request for the first content;
   sending an authentication challenge from the proxy node to the wireless device; and
   receiving at the proxy node an authentication response from the wireless device and authenticating the wireless device for the proxy node using the authentication response.

7. A method of delegating a proxy node for content delivery, comprising:
   sending from a wireless device to a first content node a request for first content stored on the first content node;
   receiving at the wireless device a proxy delegation to a proxy node from the first content node;
   receiving at the proxy node a request from the wireless device for the first content;
   sending an authentication challenge from the proxy node to the wireless device;
   receiving at the proxy node an authentication response from the wireless device and authenticating the wireless device for the proxy node using the authentication response;
   providing from the proxy node to the wireless device a list of the first content;
   receiving at the proxy node an attachment request from a second content node in response to a content request sent from the wireless device to the second content node for second content stored on the second content node, wherein the content request to the second content node comprises a proxy delegation to the proxy node;
   determining whether the second content node can associate with the proxy node;
   associating the second node to the proxy node in response to the attachment request; and
   delivering by the proxy node the second content to the wireless device.

8. The method of claim 7, wherein the attachment request comprises a network address of the second content node and an indication of the second content.

9. The method of claim 7, wherein the second content is delivered in response to a request for the second content from the wireless device.

10. The method of claim 7, wherein the second content is delivered to the wireless device automatically when the second node is attached to the proxy node.

11. The method of claim 7, further comprising:
    sending to the wireless device an updated list of content comprising the first content and the second content.

12. A system for delegating a proxy node to deliver to a wireless device a first content from a first content node and a second content from a second content node, comprising:
    a proxy node to associate the first content node with the proxy node in response to a request for the first content received from the wireless device, to receive an attachment request from the second content node in response to a request for the second content received by the second content node comprising a proxy delegation to the proxy node, to associate the second content node with the proxy node when it is determined that the second content node can associate with the proxy node in response to an attachment request received from the second content node, and to deliver the first content and the second content to the wireless device.

13. The system of claim 12, wherein the proxy node further sends to the wireless device an updated list of content comprising the first content and the second content when the second content node is associated with the proxy node.

14. The system of claim 12, wherein the attachment request comprises a network address of the second content node and an indication of the second content.

15. The system of claim 12, wherein the second content is delivered in response to a request for the second content from the wireless device to the proxy node.

16. The system of claim 12, wherein the second content is delivered to the wireless device automatically when the second node is attached to the proxy node.

\* \* \* \* \*